(12) United States Patent
de los Reyes et al.

(10) Patent No.: US 8,209,714 B2
(45) Date of Patent: Jun. 26, 2012

(54) SYSTEM AND METHOD OF PROBLEM DETECTION IN RECEIVED INTERNET DATA, VIDEO DATA, AND VOICE DATA

(75) Inventors: Gustavo de los Reyes, Fair Haven, NJ (US); Sanjay Macwan, Marlboro, NJ (US); Jennifer Morovitz, Ballwin, MO (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 316 days.

(21) Appl. No.: 12/609,172

(22) Filed: Oct. 30, 2009

(65) Prior Publication Data
US 2011/0107386 A1 May 5, 2011

(51) Int. Cl.
*H04N 60/56* (2006.01)
*H04N 5/445* (2011.01)
*H04N 7/173* (2011.01)
*G06F 3/00* (2006.01)

(52) U.S. Cl. ............... 725/12; 725/40; 725/43; 725/107
(58) Field of Classification Search .................... 725/12, 725/40, 43, 107, 131, 133, 9
See application file for complete search history.

(56) References Cited

U.S. PATENT DOCUMENTS

| | | | |
|---|---|---|---|
| 5,550,984 A | 8/1996 | Gelb | |
| 6,195,692 B1 | 2/2001 | Hsu | |
| 6,204,842 B1 | 3/2001 | Fujii | |
| 6,209,025 B1 | 3/2001 | Bellamy | |
| 6,223,213 B1 | 4/2001 | Cleron et al. | |
| 6,229,532 B1 | 5/2001 | Fujii | |
| 6,268,849 B1 | 7/2001 | Boyer et al. | |
| 6,381,748 B1 | 4/2002 | Lin et al. | |
| 6,721,721 B1 * | 4/2004 | Bates et al. | 1/1 |
| 6,748,538 B1 | 6/2004 | Chan et al. | |
| 7,263,711 B1 * | 8/2007 | Estipona | 725/112 |
| 2004/0030759 A1 | 2/2004 | Hidary et al. | |
| 2004/0163126 A1 | 8/2004 | Phillips et al. | |
| 2006/0248570 A1 | 11/2006 | Witwer | |
| 2007/0127506 A1 | 6/2007 | Absillis | |
| 2007/0184905 A1 | 8/2007 | Gatto et al. | |
| 2008/0288977 A1 * | 11/2008 | Howcroft et al. | 725/37 |
| 2008/0313670 A1 * | 12/2008 | Ho et al. | 725/34 |

* cited by examiner

*Primary Examiner* — Hunter B Lonsberry
(74) *Attorney, Agent, or Firm* — Toler Law Group, PC

(57) ABSTRACT

Methods and systems for problem detection related to received Internet data, video data, and voice data are disclosed. A method may include monitoring, at a set top box device, Internet data to detect a first problem related to the Internet data. The method may further include monitoring, at the set top box device, video data to detect a second problem related to the video data. The method may include automatically taking a first action upon detecting the first problem and automatically taking a second action upon detecting the second problem.

20 Claims, 9 Drawing Sheets

SYSTEM AND METHOD OF PROBLEM DETECTION IN RECEIVED INTERNET DATA, VIDEO DATA, AND VOICE DATA

FIELD OF THE DISCLOSURE

The present disclosure is generally related to problem detection in received Internet data, video data, and voice data.

BACKGROUND

Many homes and businesses receive data from the Internet via a cable or phone network, or via a wireless network. These dwellings may also receive video from a video network, such as a cable network, an Internet Protocol Television (IPTV) network, or a satellite network. The dwellings may receive voice from a network. Alternatively, the dwellings may receive voice, video, and data from a single network. In some systems, the data, the video, and the voice may be provided by a fiber optic cable that feeds existing telephone lines that are wired into the dwellings. For example, a supplier of voice, video, and data may provide a broadband signal carrying the data, the video, and the voice into a neighborhood of dwellings. Within a dwelling, the broadband signal can be routed to a set top box device. The set top box device differentiates between the data, the video, and the voice. Content based on Internet data and video data can be displayed by a display device such as a television. Audio, including voice, can be played by speakers integrated with the display device. Transmitted data, video, or voice may be interrupted or corrupted by a hardware or software problem, such as a virus or a loss of signal quality. A user of a communications service typically requests prompt resolution of such problems.

DETAILED DESCRIPTION

A set top box device is disclosed that includes a network interface to receive Internet data and a video receiver to receive video data. The set top box device further includes a processor responsive to the network interface to detect a problem with the received Internet data and responsive to the video receiver to detect a problem with the received video data. When a problem is detected with the received Internet data or the received video data, the processor may automatically change a size of a display window associated with the Internet data or the video data in which the problem is detected.

A processor-readable medium embodying processor-readable instructions is also disclosed. The processor-readable instructions include instructions to process first data received from a network and instructions to process second data received from the network. The processor-readable instructions include instructions to separately and simultaneously display first content based on the processed first data and second content based on the processed second data. The processor-readable instructions include instructions to detect a problem in the first data or the second data. The processor-readable instructions include instructions to automatically change the size of a display window in response to detecting the problem.

A method of processing data at a set top box device is also disclosed. The method includes monitoring, at the set top box device, Internet data to detect a first problem that relates to the Internet data. The method includes monitoring, at the set top box device, video data to detect a second problem that relates to the video data. The method also includes automatically reducing a size of a display window associated with the Internet data in response to detecting the first problem and automatically reducing a size of a display window associated with the video data in response to detecting the second problem.

Figure 1:
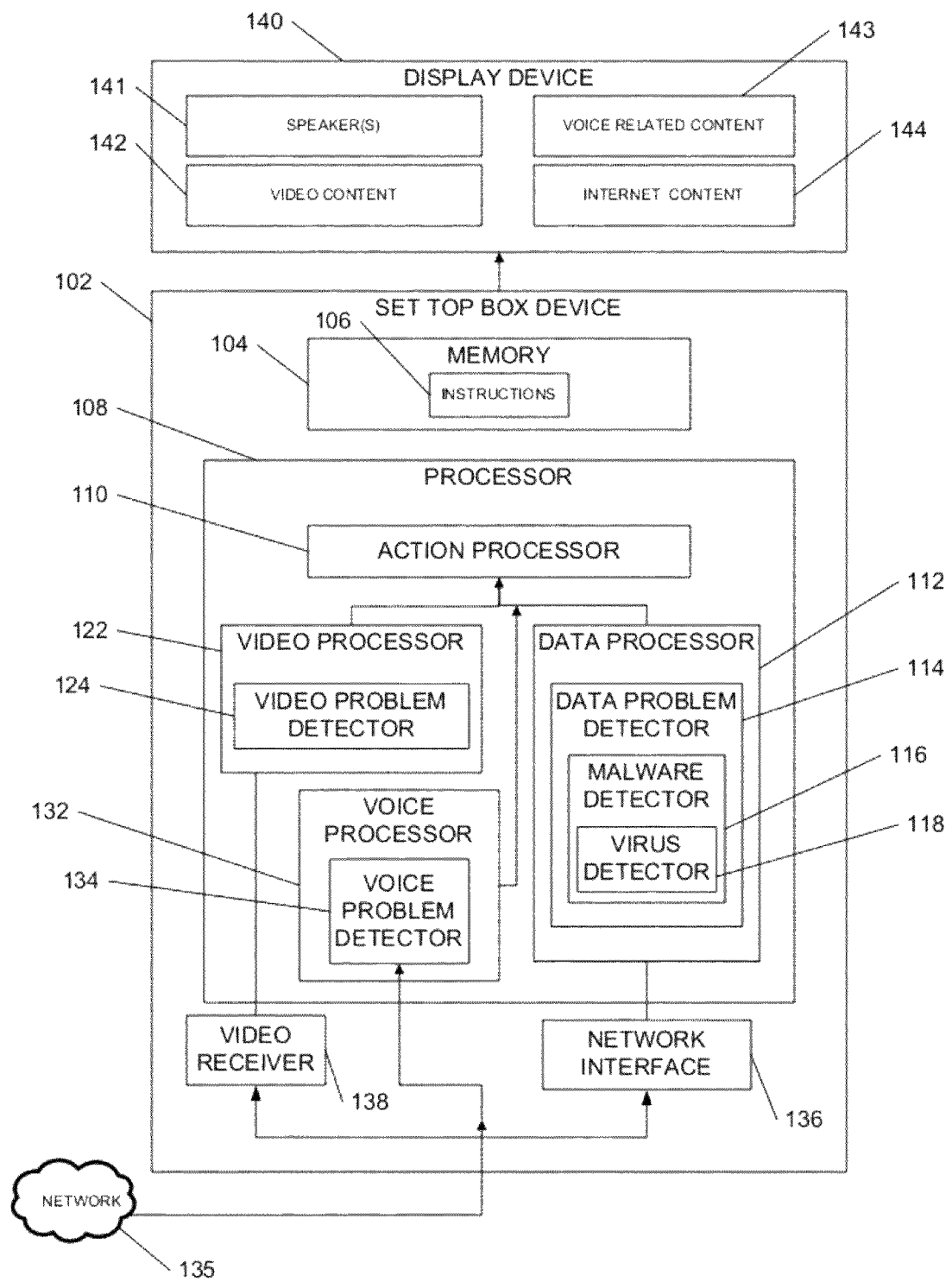
FIG. 1 is a block diagram of an embodiment of a system for problem detection in received Internet data, video data, and voice data.

FIG. 1 is a block diagram of an embodiment of a system for problem detection of received Internet data, video data, and voice data. A set top box device 102 includes a memory 104 with computer instructions 106 and a processor 108. The processor 108 executes the computer instructions 106 to perform the functions of an action processor 110, a data processor 112, a video processor 122, and a voice processor 132. Data processed by the data processor 112 is received at a network interface 136 from a network 135. Video data processed by the video processor 122 is received at a video receiver 138 from the network 135. Video data may include moving pictures data and may be compressed (encoded). Voice data processed by the voice processor 132 is received from the network 135. The voice data may include digitized voice signals and may be compressed (encoded). The network 135 may include a cable network, a satellite network, other wireless network, an Internet Protocol Television (IPTV) network, a phone network such as the Public Switched Telephone Network (PSTN), or any combination thereof.

Video content 142 based on video data and Internet content 144 based on Internet data are displayable on a display device 140 coupled to the set top box 102. The display device 140 may also have one or more speakers 141 to produce sound from audio data. The audio data may be from the video data, the Internet data, or from the voice data. The display device 140 may also display information concerning a problem detected with respect to the Internet, the video, or the voice data streams. For example, voice related content 143 that concerns a problem detected in the voice data may be displayed.

The data processor 112 has a data problem detector 114 adapted to detect a problem in the data from the network 135. The data from the network 135 may include Internet data. The data problem detector 114 may detect a loss of signal quality or a loss of signal synchronization. The data problem detector 114 may include a malware detector 116. The problems detected by the malware detector 116 may include a virus, a Trojan horse, a worm, a rootkit, spyware, adware, a backdoor, or crimeware, among other alternatives. Thus, the malware detector 116 may include a virus detector 118 as one of its components. An emergency signal may also be detected. In response to the detection of a problem in the data by the data problem detector 114, the action processor 110 determines an action to be automatically taken.

Actions that may be automatically taken may include reducing a size of a display window of the display device 140 associated with the data having the problem. The display window of reduced size may be displayed simultaneously with a larger window associated with a non-problematic data stream. Actions that may be automatically taken also include displaying a message concerning the problem, displaying one or more user-selectable options to respond to the detected problem, rebooting the set top box device 102, performing a self-test of the set top box device 102, re-synchronizing the data signal, adjusting operating parameters of a channel estimator, isolating or quarantining malware, disinfecting infected data, and sending a signal to a computer via the network 135. The signal sent to the computer via the network 135 may include a request to resend data. Actions to be automatically taken may be pre-selected by a user of the display device 140 from a menu of actions, or an action to be automatically taken may be a default action. For example, the default action may be to run a virus scan of the Internet data.

The video processor 122 has a video problem detector 124 adapted to detect a problem in the video data processed by video processor 122. Problems that may be detected by the video problem detector 124 include an absence of a signal, an idle signal, a loss of signal quality or synchronization, or an emergency signal, among other alternatives. In response to the detection of a problem in the video data by the video problem detector 124, the action processor 110 determines an action to be automatically taken.

Actions that may be automatically taken include reducing a size of a display window of the display device 140 associated with the video data having the problem. The display window of reduced size may be displayed simultaneously with a larger window associated with a non-problematic data stream. The actions that may automatically be taken also include increasing the size of a display window associated with a non-problematic data stream, displaying a message concerning the problem, displaying one or more user-selectable options to respond to the detected problem, rebooting the set top box device 102, performing a self-test of the set top box device 102, re-synchronizing the video data signal, adjusting operating parameters of a video encoder, and sending a signal to a source of the video. The signal sent to the video source may include a request to resend video data. Actions to be automatically taken may be pre-selected by a user of the display device 140 from a menu of actions, or an action to be automatically taken may be a default action. For example, the default action may be to display a message identifying the problem and providing options to repair or isolate the problem. As another example, the default action may be to adjust operating parameters of a video decoder in response to detection of a problem in the video data.

The voice processor 132 has a voice problem detector 134 adapted to detect a problem in the voice data received from the network 135. Problems that may be detected by the voice problem detector 134 include an absence of a signal, an idle signal, a loss of signal quality or synchronization, or an emergency signal. In response to detection of a problem in the voice data by the voice problem detector 134, the action processor 110 determines an action to be automatically taken.

Actions that may be automatically taken include reducing a size of a display window displaying voice related content 143 associated with the voice data. For example, the voice related content 143 may include information about the source of the voice data. The display window of reduced size may be displayed simultaneously with a larger window associated with a non-problematic data stream. The actions that may be automatically taken also include increasing the size of a display window associated with a non-problematic data stream, displaying a message concerning the problem, displaying one or more user-selectable options to respond to the detected problem, rebooting the set top box device 102, performing a self-test of the set top box device 102, re-synchronizing the voice data signal, adjusting operating parameters of a voice decoder, and sending a signal to the network 135. The signal sent to the network 135 may include a request to resend voice data. Actions to be automatically taken may be pre-selected by a user of the display device 140 from a menu of actions, or an action to be automatically taken may be a default action. For example, the default action may be to resynchronize the voice data or to adjust operating parameters of a speech decoder.

In some embodiments, an Internet data stream, a video data stream, and a voice data stream may be separately processed by a set top box device. Each data stream may be simultaneously and separately rendered by a display device. Each data stream can be monitored independently and simultaneously, or nearly simultaneously, by a processor of the set top box device to detect a problem.

In response to detecting a problem, the processor may automatically take an action to repair or isolate the problem or to reduce the impact of the problem. The action to be taken may be pre-selected and may depend upon which data stream has the problem. For example, in the case of a problem detected in Internet data, the processor may automatically run an anti-virus algorithm to detect a virus, whereas, in the case of a problem detected in video data, the processor may automatically attempt to restore signal synchronization. Since the data, video, and voice streams are each processed separately, a problem in one stream should not affect another stream. Thus, for example, a user of the content displayed by the display device 140 will not be inconvenienced by losing video service when the problem is in the Internet data.

Figure 2:
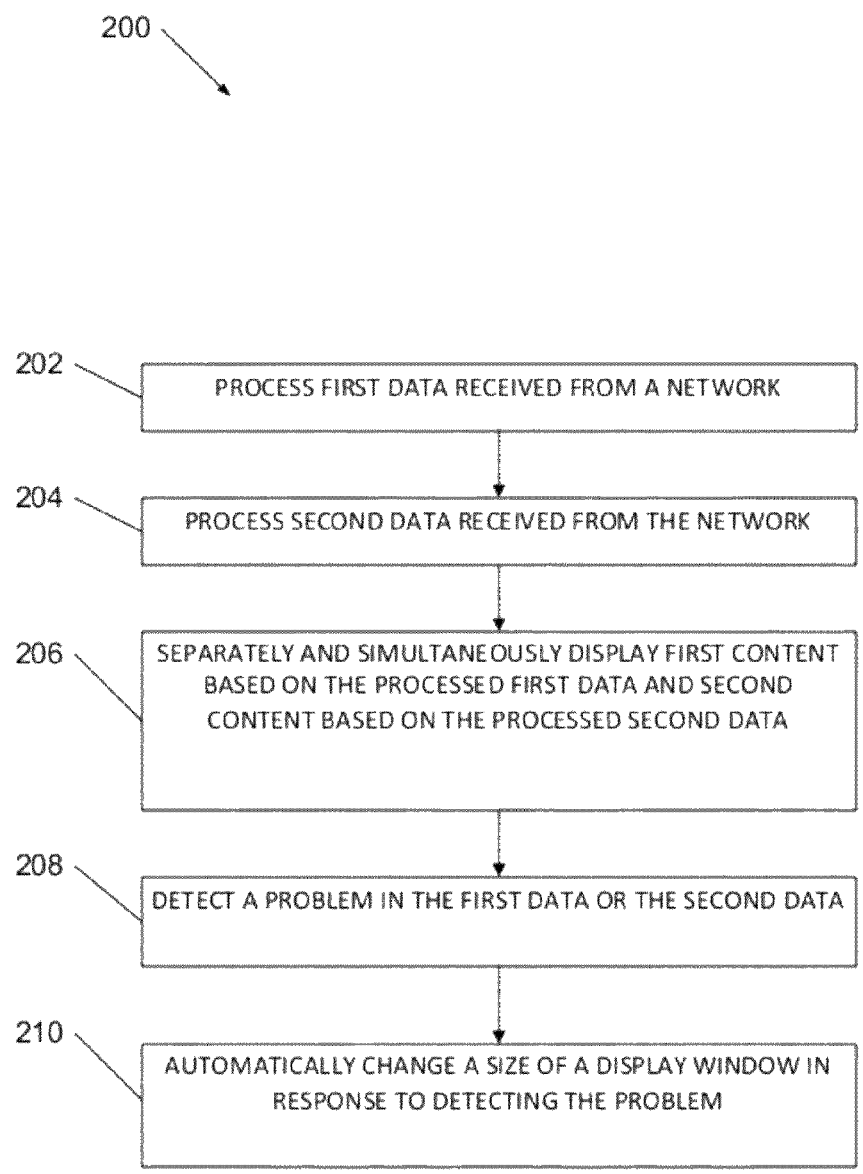
FIG. 2 is a flow diagram of a first embodiment of a method of problem detection in received Internet data, video data, and voice data.

FIG. 2 is a flow diagram 200 of a first embodiment of a method of problem detection in received Internet data, video data, and voice data. The embodiment of FIG. 2 can be implemented by a processor, such as the processor 108 of FIG. 1, executing processor-readable instructions, such as the instructions 106, embodied in a processor-readable medium, such as the memory 104.

First data received from a network is processed, at 202. Second data received from the network is processed, at 204. First content based on the processed first data and second content based on the processed second data are separately and simultaneously displayed on a display device, at 206. First content based on the processed first data may include text, hyperlinks, moving pictures, and sound. Second content based on the second data may also include at least moving pictures and sound. A problem in the first data or the second data is detected, at 208. A size of a display window is automatically changed in response to detecting the problem, at 210.

In some embodiments, when a problem is detected in both the first data and the second data, actions are automatically taken for each problem. For example, when a first problem is detected in the first data, the action may be to run a virus scan, whereas when a second problem is detected in the second data, the action may be to reboot the set top box device. In such a case, the response may be to run the virus scan first, followed by a reboot of the set top box device. In some embodiments, only one of the actions is taken. For example, the actions may be prioritized and the action with the highest priority may be the action automatically taken.

In some embodiments, the data, the video, and the voice streams are received from a common network. In alternative embodiments, the data may be from a first network, such as a wide area network, the video may be from a second network, such as a cable television network, and the voice may be from a third network, such as a phone network.

An action to be automatically taken in response to a detected problem may include displaying a message concerning the detected problem. The message concerning the detected problem may include a list of options to respond to the detected problem. A user may select an option using a remote control device that wirelessly signals the set top box device. The list of options may include an option to quarantine a virus, to disinfect data, to reboot a set top box device, to perform a self test of a set top box device, to re-synchronize the received data stream, to adjust operating parameters of a channel estimator or decoder, to send a signal to a source of the data having the problem, or any combination thereof. In some embodiments, an action to be automatically taken is pre-selectable by a user. Alternatively, the action to be automatically taken may be a default action when the user does not pre-select an action to be automatically taken. For example, a default action may be to display a message concerning the problem, such as a description of the problem. The default action may be to automatically reboot the set top box device. Other default actions may be prescribed.

Figure 3:
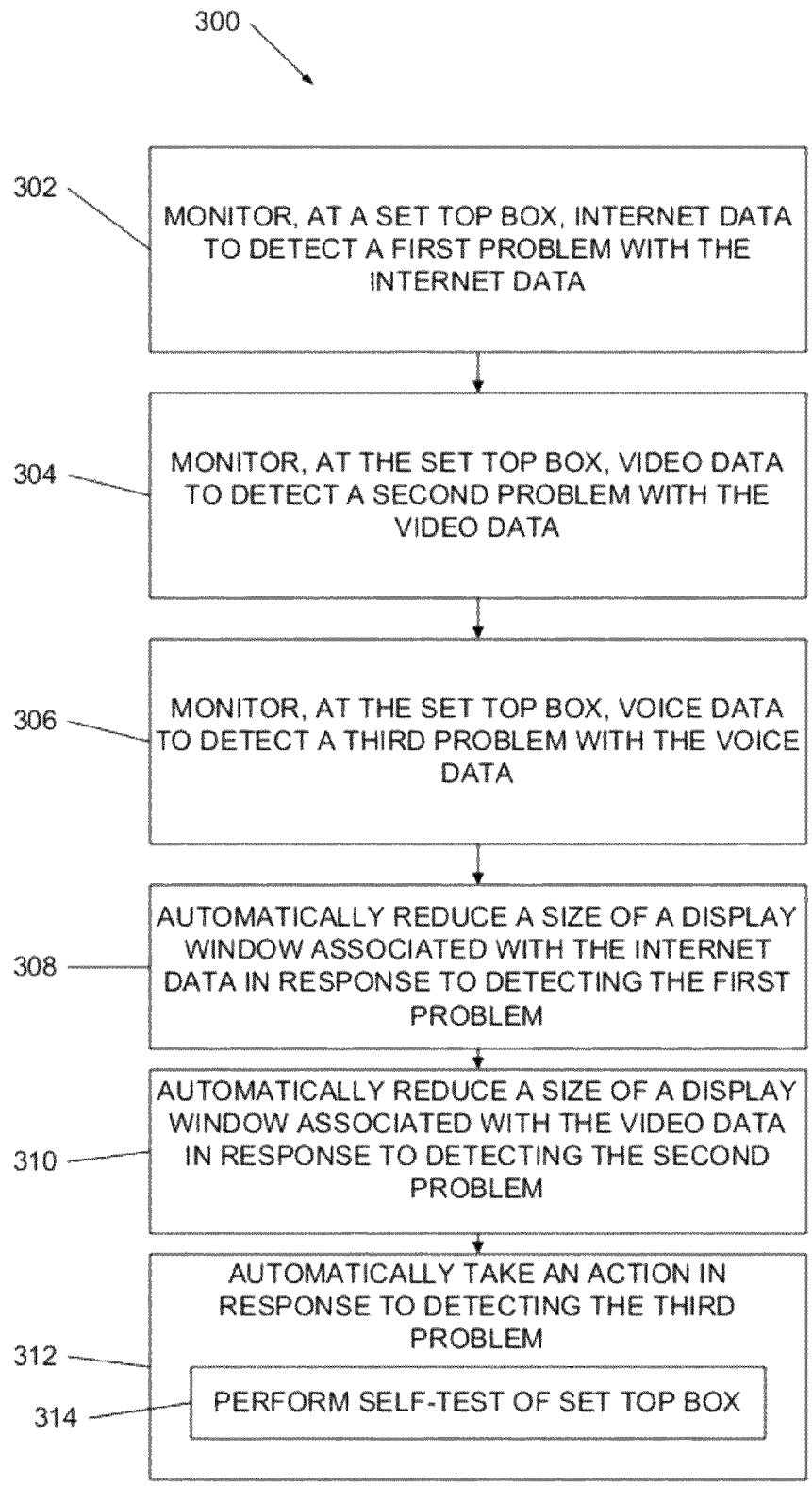
FIG. 3 is a flow diagram of a second embodiment of a method of problem detection in received Internet data, video data, and voice data.

FIG. 3 is a flow diagram 300 of a second embodiment of a method of problem detection in received Internet data, video data, and voice data. A set top box device, such as the set top box device 102 of FIG. 1, monitors Internet data to detect a first problem with the Internet data, at 302. The first problem may include a loss of signal, a loss of signal synchronization or signal quality, a virus, or an emergency signal. The set top box device monitors video data to detect a second problem with the video data, at 304. A second problem may include a loss of signal, a loss of signal synchronization or quality, ineffective video decoding, or an emergency signal. The set top box device also monitors voice data to detect a third problem with the voice data, at 306. A third problem may include a loss of signal, a loss of signal synchronization or signal quality, ineffective voice decoding, or an emergency signal.

When a problem is detected in more than one of the Internet data, the video data, and the voice data, an action may be automatically taken with respect to each problem detected. In some embodiments, the actions are taken simultaneously. In other embodiments, the actions may be taken in sequence. In some embodiments, only the action that has a higher priority than the other actions is taken. In some embodiments, the actions are taken in an order determined by a ranking of the actions.

The set top box device automatically reduces a size of a display window associated with the Internet data in response to detecting the first problem, at 308. Other actions that may automatically be taken include displaying a message concerning the problem, displaying one or more user-selectable options to respond to the detected problem, rebooting the set top box device 102, re-synchronizing the Internet data, adjusting a channel estimator, performing a self-test on the set top box device 102, isolating or quarantining malware, disinfecting infected data, and sending a signal to a computer via the network 135. A signal sent to the computer may request that data be resent.

The set top box device automatically reduces a size of a display window associated with the video data in response to detecting the second problem, at 310. Other actions that may be taken include displaying a message concerning the problem, displaying one or more user-selectable options to respond to the detected problem, rebooting the set top box device 102, re-synchronizing the video data, adjusting a video decoder, performing a self-test of the set top box device 102, and sending a signal to a source of the video data. A signal sent to the video source may include a request to resend video data.

The set top box device automatically takes a third action in response to detecting the third problem with the voice data, at 312. The third action may include reducing a size of a display window associated with the voice data, displaying a message concerning the problem, displaying one or more user-selectable options to respond to the detected problem, rebooting the set top box device 102, re-synchronizing the voice data, adjusting a voice decoder, and sending a signal to a source of the voice data. A signal sent to the source of the voice data may include a request to resend voice data. In one embodiment, the third action may include performing a self-test of the set top box device, at 314.

Figure 4:
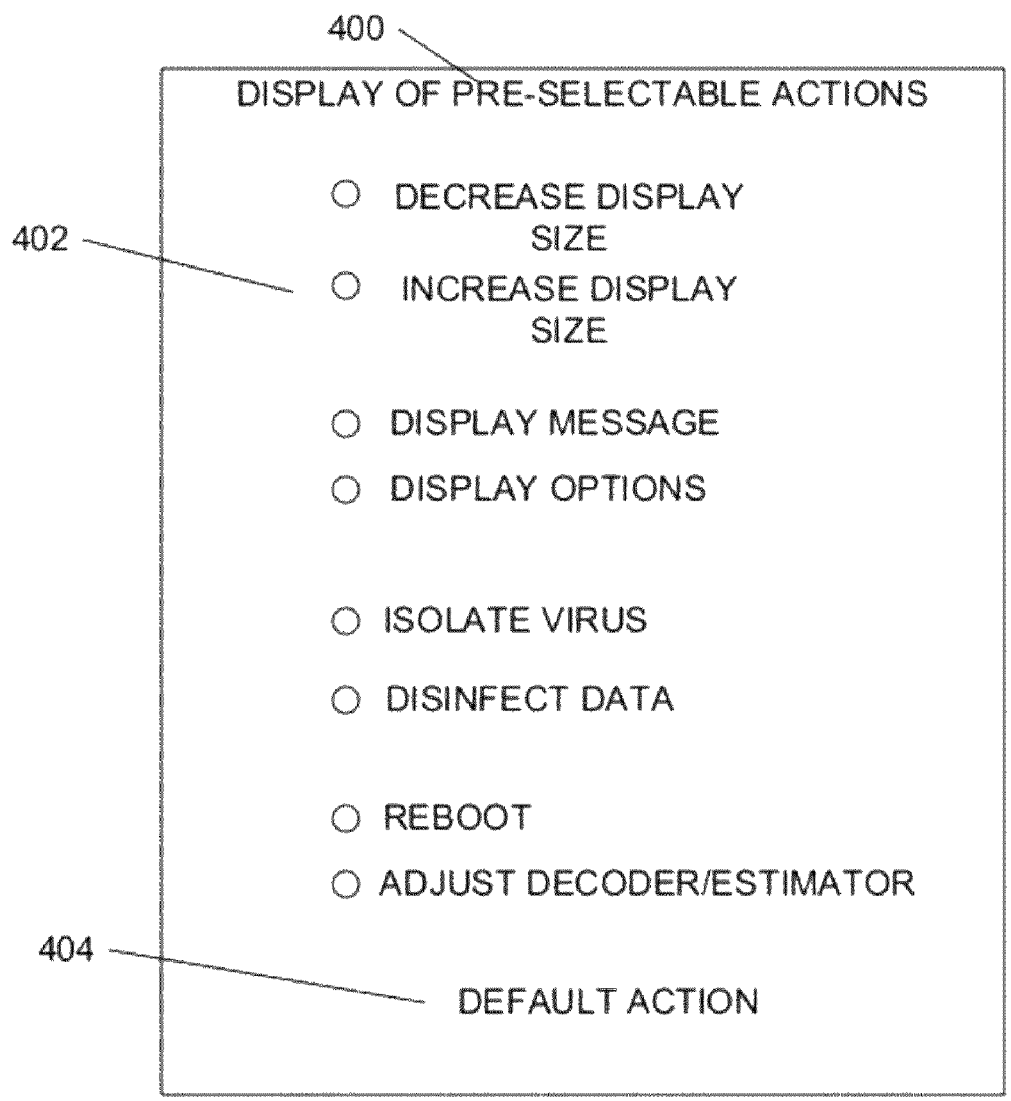
FIG. 4 depicts an interface to display user selectable actions.

FIG. 4 depicts an interface 400 to display pre-selectable actions 402. The actions may be selected before a problem occurs. One or more actions may be selected. For example, a user may pre-select to decrease the size of a display window associated with Internet, video, or voice data having the problem and to increase the size of a display window associated with the Internet, video, or voice data not having the problem. Additionally, or in the alternative, the user may pre-select the "display message" action, and/or the "display options" action. Alternatively, or in addition, the user may pre-select to isolate a virus if one is detected and may also pre-select to disinfect data infected by the virus. Additionally, or in the alternative, the user may pre-select to reboot the set top box device. Additionally, or in the alternative, the user may pre-select adjusting a channel estimator or a decoder of the video or voice. If a user does not pre-select an action, then a default action 404 may be taken.

In some embodiments, a first set of pre-selectable actions to be taken when a problem occurs in Internet data may be displayed in a first display window, a second set of pre-selectable actions to be taken when a problem occurs in the video may be displayed in a second display window, and a third set of pre-selectable actions to be taken when a problem occurs in the voice may be displayed in a third display window. This enables the user of the display to have substantially complete control over the actions to be taken when a problem is detected in any one or more of the data, video, and voice.

Figure 5:
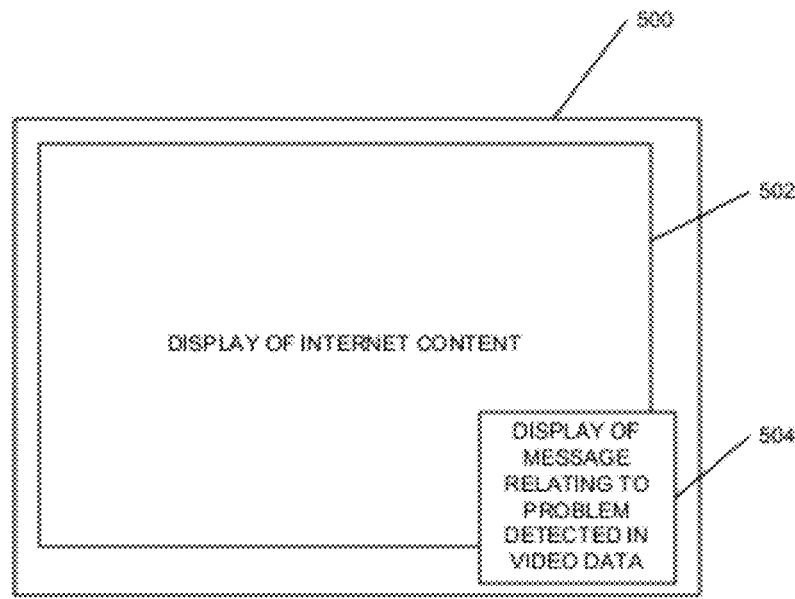
FIG. 5 depicts an interface to display a message relating to a problem detected in video data.

FIG. 5 depicts an interface 500 to display a message relating to a problem detected in video data. In normal operation, before a problem is detected, a display of first content from a video source and a display of second content from the Internet may be about equal in size. However, when a problem is detected in the video data, the size of the window 504 associated with the video content may be reduced, whereas the size of the window 502 associated with the Internet content may be enlarged. Also, a message concerning the problem detected in the video data may be displayed in the window of reduced size. The message may indicate that a particular action is being taken to remedy the problem.

When a problem occurs in the video data, the user may no longer desire to devote space on the display to the video data.

Consequently, reducing the size of the window associated with problematic video data and enlarging the size of the window associated with the non-problematic Internet data is convenient to the user. This enables the user to interact on the Internet while a problem in the video is being addressed by, for example, re-synchronizing a received video signal.

Figure 6:
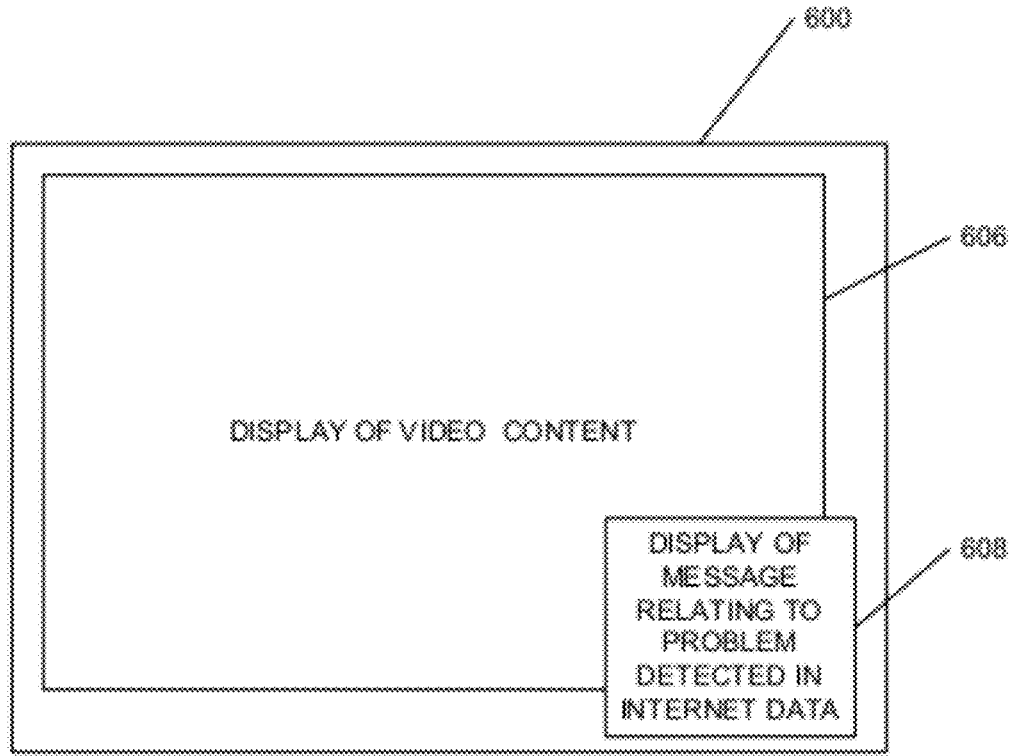
FIG. 6 depicts an interface to display a message relating to a problem detected in Internet data.

FIG. 6 depicts an interface 600 to display a message relating to a problem detected in Internet data. When a problem is detected in the Internet data, the size of the window 608 associated with the Internet data may be reduced, whereas the size of the window 606 associated with the video data may be enlarged. Also, a message concerning the problem detected in the Internet data may be displayed in the window of reduced size. The message may indicate that a particular action is being taken to remedy the problem.

When a problem occurs in the Internet data, the user may no longer desire to devote space on the display to Internet content. Consequently, reducing the size of the window associated with the Internet data and enlarging the size of the window associated with the non-problematic video data is convenient to the user. This enables the user to watch video content while a problem in the Internet data is being addressed by, for example, performing a virus scan.

Figure 7:
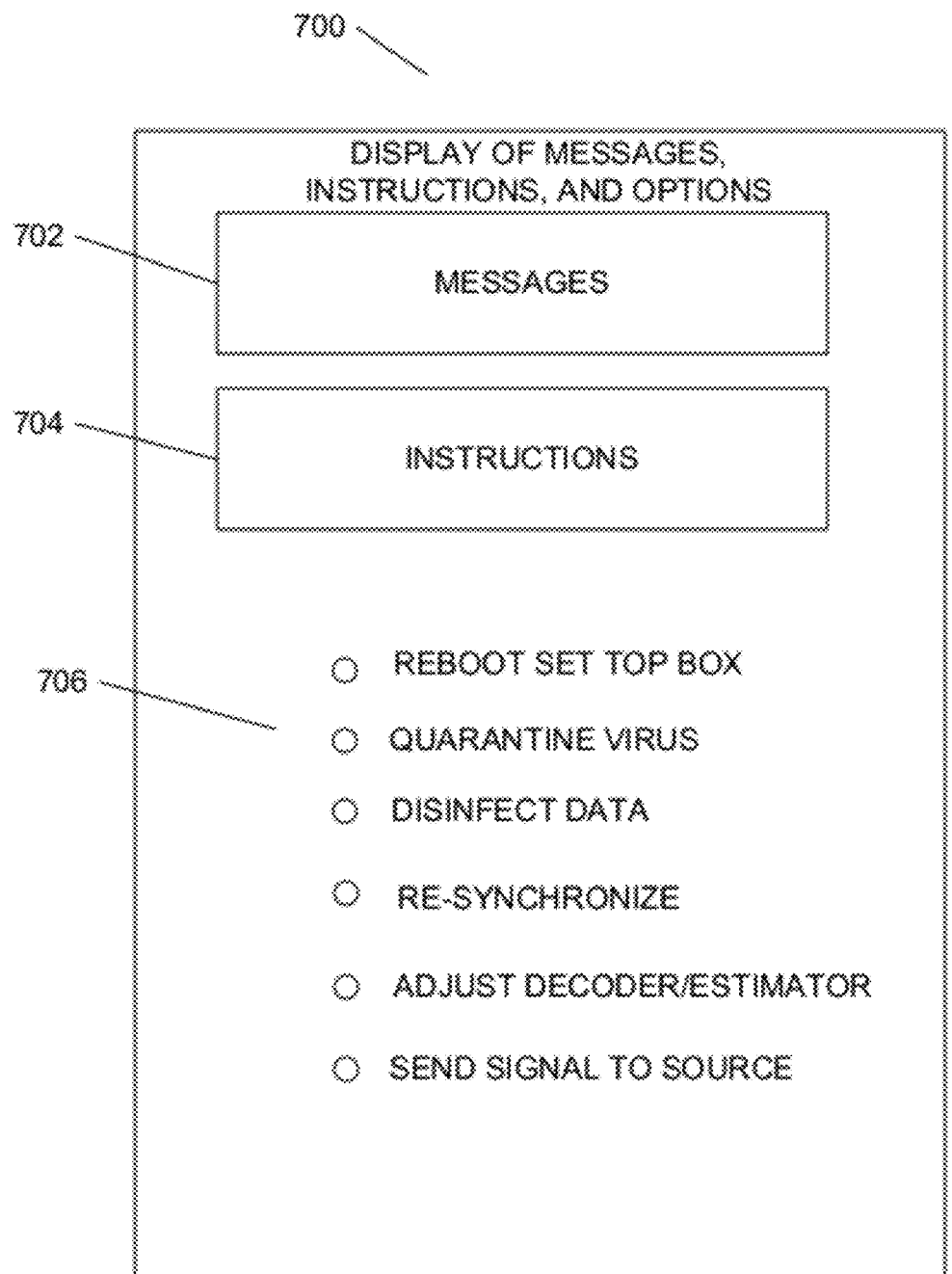
FIG. 7 depicts an interface to display messages, instructions, and options.

In some embodiments, a window also may be displayed concerning a problem detected in voice data. The window may include a message that indicates that re-synchronization of the voice data is taking place or that the parameters of a voice decoder are being adjusted, for example FIG. 7 depicts an interface 700 to display messages 702, instructions 704, and options 706. The messages 702 may include a description of the problem detected and the data stream in which the problem was detected. The instructions 704 may state which of the listed options is recommended. The options 706 may include rebooting a set top box device, quarantining a virus, disinfecting data, re-synchronizing a signal, adjusting operating parameters of a decoder or channel estimator, and sending a signal to a source of the data stream having the problem. The signal to the source may include a message to the source that a problem has been detected with data from the source. The signal to the source may include information about the detected problem. For example, the signal to the source may indicate that the problem is a loss of signal. The signal to the source may further include a request to the source to resend data from the source.

The options that are displayed may depend on which data stream has the problem. For example, for a problem in the Internet data, the options displayed may include quarantining a virus after a virus scan, disinfecting data, adjusting parameters of a channel estimator, and sending a signal to a source of the Internet data, such as a server. For a problem in the video data, the options displayed may include re-synchronizing the data, rebooting the set top box device, adjusting parameters of a video decoder, or sending a signal to a source of the video data such as a video server. For a problem in the voice data, the options displayed may include re-synchronizing the voice data, adjusting parameters of a voice decoder, or sending a message to a source of the voice data such as a phone network.

Thus, when a problem is detected in Internet data, video data, or voice data, an action may automatically be taken that is pre-selectable by a user and that resolves the problem or reduces its impact on performance.

Figure 8:
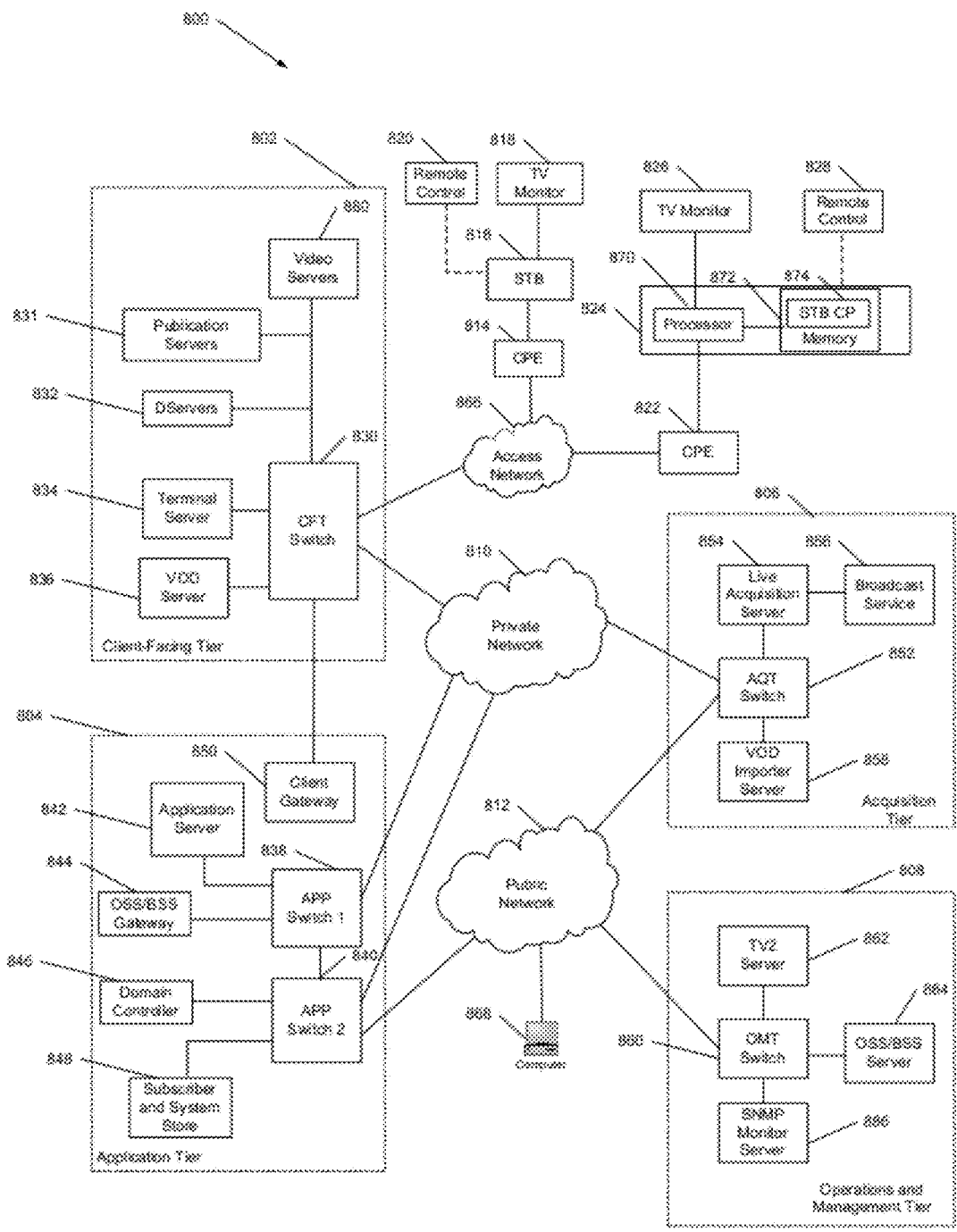
FIG. 8 is a block diagram of an illustrative embodiment of an Internet Protocol Television (IPTV) system to distribute multimedia content.

Referring to FIG. 8, an illustrative embodiment of an Internet Protocol Television (IPTV) system that may be used to distribute data, video, and voice is shown, and is generally designated 800. For example, the IPTV system 800 may be used to deliver data, video, and voice to the set top box device 102 of FIG. 1. As shown, the system 800 can include a client facing tier 802, an application tier 804, an acquisition tier 806, and an operations and management tier 808. Each tier 802, 804, 806, 808 is coupled to a private network 810; to a public network 812, such as the Internet; or to both the private network 810 and the public network 812. For example, the client-facing tier 802 can be coupled to the private network 810. Further, the application tier 804 can be coupled to the private network 810 and to the public network 812. The acquisition tier 806 can also be coupled to the private network 810 and to the public network 812. Additionally, the operations and management tier 808 can be coupled to the public network 812.

As illustrated in FIG. 8, the various tiers 802, 804, 806, 808 communicate with each other via the private network 810 and the public network 812. For instance, the client-facing tier 802 can communicate with the application tier 804 and the acquisition tier 806 via the private network 810. The application tier 804 can communicate with the acquisition tier 806 via the private network 810. Further, the application tier 804 can communicate with the acquisition tier 806 and the operations and management tier 808 via the public network 812. Moreover, the acquisition tier 806 can communicate with the operations and management tier 808 via the public network 812. In a particular embodiment, elements of the application tier 804, including, but not limited to, a client gateway 850, can communicate directly with the client-facing tier 802.

The client-facing tier 802 can communicate with user equipment via an access network 866, such as an Internet Protocol Television (IPTV) access network. For example, the access network 866 may be the communications network 135 of FIG. 1. In an illustrative embodiment, customer premises equipment (CPE) 814, 822 can be coupled to a local switch, router, or other device of the access network 866. The client-facing tier 802 can communicate with a first representative set-top box device 816 at a first customer premises via the first CPE 814 and with a second representative set-top box device 824 at a second customer premises via the second CPE 822. The CPE 814, 822 can include routers, local area network devices, modems, such as digital subscriber line (DSL) modems, any other suitable devices for facilitating communication between a set-top box device and the access network 866, or any combination thereof. For example, CPE 814, 822 may be a residential gateway, As an illustrative example, the first representative set-top box device 816 at the first customer premises may be the set top box device 102 of FIG. 1.

In a particular embodiment, the client-facing tier 802 can be coupled to the CPE 814, 822 via fiber optic cables. Alternatively, the CPE 814, 822 can be digital subscriber line (DSL) modems that are coupled to one or more network nodes via twisted pairs, and the client-facing tier 802 can be coupled to the network nodes via fiber-optic cables. Each set-top box device 816, 824 can process data received via the access network 866 via an IPTV software platform.

The first set-top box device 816 can be coupled to a first external display device, such as a first television monitor 818, and the second set-top box device 824 can be coupled to a second external display device, such as a second television monitor 826. Moreover, the first set-top box device 816 can communicate with a first remote control 820, and the second set-top box device 824 can communicate with a second remote control 828.

In an exemplary, non-limiting embodiment, each set-top box device 816, 824 can receive data, video, voice, or any combination thereof, from the client-facing tier 802 via the access network 866 and may render or display the data, video, or any combination thereof, at the display device 818, 826 to which it is coupled. In an illustrative embodiment, the set-top box devices 816, 824 can include tuners that receive and decode television programming signals or packet streams for transmission to the display devices 818, 826. Further, the set-top box devices 816, 824 can include a STB processor 870 and a STB memory device 872 that is accessible to the STB processor 870. In one embodiment, a computer program, such as the STB computer program 874, can be embedded within the STB memory device 872. In another illustrative embodiment, a user computing device, such as a personal computer, laptop or local server, can be coupled to a set-top box device, such as the second representative set-top box device 824, for example, via a universal serial bus (USB) connection or other connection.

In an illustrative embodiment, the client-facing tier 802 can include a client-facing tier (CFT) switch 830 that manages communication between the client-facing tier 802 and the access network 866 and between the client-facing tier 802 and the private network 810. As illustrated, the CFT switch 830 is coupled to one or more data servers, such as D-servers 832, that store, format, encode, replicate, or otherwise manipulate or prepare video content for communication from the client-facing tier 802 to the set-top box devices 816, 824. The CFT switch 830 can also be coupled to a terminal server 834 that provides terminal devices with a connection point to the private network 810. In a particular embodiment, the CFT switch 830 can be coupled to a video-on-demand (VOD) server 836 that stores or provides VOD content imported by the IPTV system 800.

Further, the CFT switch 830 is coupled to one or more video servers 880 that receive video content and transmit the content to the set-top boxes 816, 824 via the access network 866. In a particular embodiment, the CFT switch 830 can be coupled to one or more publication servers 831 that facilitate the formation of groups that share private content and the inclusion of indicators of such private content with video content received by users in a group.

In an illustrative embodiment, the client-facing tier 802 can communicate with a large number of set-top boxes, such as the representative set-top boxes 816, 824 over a wide geographic area, such as a regional area, a metropolitan area, a viewing area, a designated market area or any other suitable geographic area, market area, or subscriber or customer group that can be supported by networking the client-facing tier 802 to numerous set-top box devices. In a particular embodiment, the CFT switch 830, or any portion thereof, can include a multicast router or switch that feeds one or more video streams from a video server to multiple set-top box devices.

As illustrated in FIG. 8, the application tier 804 can communicate with both the private network 810 and the public network 812. The application tier 804 can include a first application tier (APP) switch 838 and a second APP switch 840. In a particular embodiment, the first APP switch 838 can be coupled to the second APP switch 840. The first APP switch 838 can be coupled to an application server 842 and to an OSS/BSS gateway 844. In a particular embodiment, the application server 842 can provide applications to the set-top box devices 816, 824 via the access network 866, which enable the set-top box devices 816, 824 to provide functions, such as display, messaging, processing of IPTV data and Video On Demand (VOD) material, etc. In a particular embodiment, the OSS/BSS gateway 844 includes operation systems and support (OSS) data, as well as billing systems and support (BSS) data. In one embodiment, the OSS/BSS gateway 844 can provide or restrict access to an OSS/BSS server 864 that stores operations and billing systems data.

The second APP switch 840 can be coupled to a domain controller 846 that provides Internet access, for example, to users at their computers 868 via the public network 812. For example, the domain controller 846 can provide remote Internet access to IPTV account information, e-mail, personalized Internet services, or other online services via the public network 812. In addition, the second APP switch 840 can be coupled to a subscriber and system store 848 that includes account information, such as account information that is associated with users who access the IPTV system 800 via the private network 810 or the public network 812. In an illustrative embodiment, the subscriber and system store 848 can store subscriber or customer data and create subscriber or customer profiles that are associated with IP addresses of corresponding set-top box devices 816, 824.

In a particular embodiment, the application tier 804 can include a client gateway 850 that communicates data directly to the client-facing tier 802. In this embodiment, the client gateway 850 can be coupled directly to the CFT switch 830. The client gateway 850 can provide user access to the private network 810 and the tiers coupled thereto. In an illustrative embodiment, the set-top box devices 816, 824 can access the IPTV system 800 via the access network 866, using information received from the client gateway 850. User devices can access the client gateway 850 via the access network 866, and the client gateway 850 can allow such devices to access the private network 810 once the devices are authenticated or verified. Similarly, the client gateway 850 can prevent unauthorized devices, such as hacker computers or stolen set-top box devices, from accessing the private network 810, by denying access to these devices beyond the access network 866.

For example, when the first representative set-top box device 816 accesses the client-facing tier 802 via the access network 866, the client gateway 850 can verify subscriber information by communicating with the subscriber and system store 848 via the private network 810. Further, the client gateway 850 can verify billing information and status by communicating with the OSS/BSS gateway 844 via the private network 810. In one embodiment, the OSS/BSS gateway 844 can transmit a query via the public network 812 to the OSS/BSS server 864. After the client gateway 850 confirms subscriber and/or billing information, the client gateway 850 can allow the set-top box device 816 to access IPTV content and VOD content at the client-facing tier 802. If the client gateway 850 cannot verify subscriber information for the set-top box device 816, e.g., because it is connected to an unauthorized twisted pair, the client gateway 850 can block transmissions to and from the set-top box device 816 beyond the access network 866.

As indicated in FIG. 8, the acquisition tier 806 includes an acquisition tier (AQT) switch 852 that communicates with the private network 810. The AQT switch 852 can also communicate with the operations and management tier 808 via the public network 812. In a particular embodiment, the AQT switch 852 can be coupled to a live acquisition server 854 that receives or acquires television content, movie content, advertisement content, other video content, voice, data, or any combination thereof, from a broadcast service 856, such as a satellite acquisition system or satellite head-end office. In a particular embodiment, the live acquisition server 854 can transmit content to the AQT switch 852, and the AQT switch 852 can transmit the content to the CFT switch 830 via the private network 810.

In an illustrative embodiment, content can be transmitted to the D-servers 832, where the content can be encoded, formatted, stored, replicated, or otherwise manipulated and prepared for communication from the video server(s) 880 to the set-top box devices 816, 824. The CFT switch 830 can receive content from the video server(s) 880 and communicate the content to the CPE 814, 822 via the access network 866. The set-top box devices 816, 824 can receive the content via the CPE 814, 822, and can transmit the content to the television monitors 818, 826. In an illustrative embodiment, video or audio portions of the content can be streamed to the set-top box devices 816, 824.

Further, the AQT switch 852 can be coupled to a video-on-demand importer server 858 that receives and stores television or movie content received at the acquisition tier 806 and communicates the stored content to the VOD server 836 at the client-facing tier 802 via the private network 810. Additionally, at the acquisition tier 806, the video-on-demand (VOD) importer server 858 can receive content from one or more VOD sources outside the IPTV system 800, such as movie studios and programmers of non-live content. The VOD importer server 858 can transmit the VOD content to the AQT switch 852, and the AQT switch 852, in turn, can communicate the material to the CFT switch 830 via the private network 810. The VOD content can be stored at one or more servers, such as the VOD server 836.

When users issue requests for VOD content via the set-top box devices 816, 824, the requests can be transmitted over the access network 866 to the VOD server 836, via the CFT switch 830. Upon receiving such requests, the VOD server 836 can retrieve the requested VOD content and may transmit the content to the set-top box devices 816, 824 across the access network 866, via the CFT switch 830. The set-top box devices 816, 824 can transmit the VOD content to the television monitors 818, 826. In an illustrative embodiment, video or audio portions of VOD content can be streamed to the set-top box devices 816, 824.

FIG. 8 further illustrates that the operations and management tier 808 can include an operations and management tier (OMT) switch 860 that conducts communication between the operations and management tier 808 and the public network 812. In the embodiment illustrated by FIG. 8, the OMT switch 860 is coupled to a TV2 server 862. Additionally, the OMT switch 860 can be coupled to an OSS/BSS server 864 and to a simple network management protocol (SNMP) monitor 886 that monitors network devices within or coupled to the IPTV system 800. In a particular embodiment, the OMT switch 860 can communicate with the AQT switch 852 via the public network 812.

In operation, the set top box 816 may receive Internet data, video data, and voice data from the access network 866. The Internet data, video data, and voice data are separately and simultaneously monitored for problems by the set top box 816. When a problem is detected, a size of a window of the TV monitor 818 associated with the Internet data, video data, or voice data that has the problem is reduced. The set top box 816 may take further remedial actions to resolve the problem. For example, the remedial actions taken by the set top box 816 may include rebooting the set top box device 816, quarantining a virus, disinfecting data, re-synchronizing a signal, adjusting operating parameters of a decoder or channel estimator, and sending a signal to a source of the data stream having the problem Referring to FIG. 9, an illustrative embodiment of a general computer system is shown and is designated 900. The computer system 900 includes a set of instructions that can be executed to cause the computer system 900 to perform any one or more of the methods or computer based functions disclosed herein. The computer system 900, or any portion thereof, may operate as a standalone device or may be connected, e.g., using a network, to other computer systems or peripheral devices.

In a networked deployment, the computer system 900 may operate in the capacity of a set-top box device, a server, or a mobile computing device. For example, the computer system may include: the set top box device 102 of FIG. 1, the set top box device 816, or the set top box device 824, the video server 880, the terminal server 834, the Video On Demand (VOD) server 836, the client gateway 850, the application server 842, or the computer 868 of FIG. 8.

The computer system 900 can also be implemented as or incorporated into various devices, such as a personal computer (PC), a tablet PC, a personal digital assistant (PDA), a mobile device, a palmtop computer, a laptop computer, a desktop computer, a communications device, a web appliance, or any other machine capable of executing a set of instructions (sequential or otherwise) that specify actions to be taken by that machine. In a particular embodiment, the computer system 900 can be implemented using electronic devices that provide voice, video or data communication. Further, while a single computer system 900 is illustrated, the term "system" shall also be taken to include any collection of systems or sub-systems that individually or jointly execute a set, or multiple sets, of instructions to perform one or more computer functions.

Figure 9:
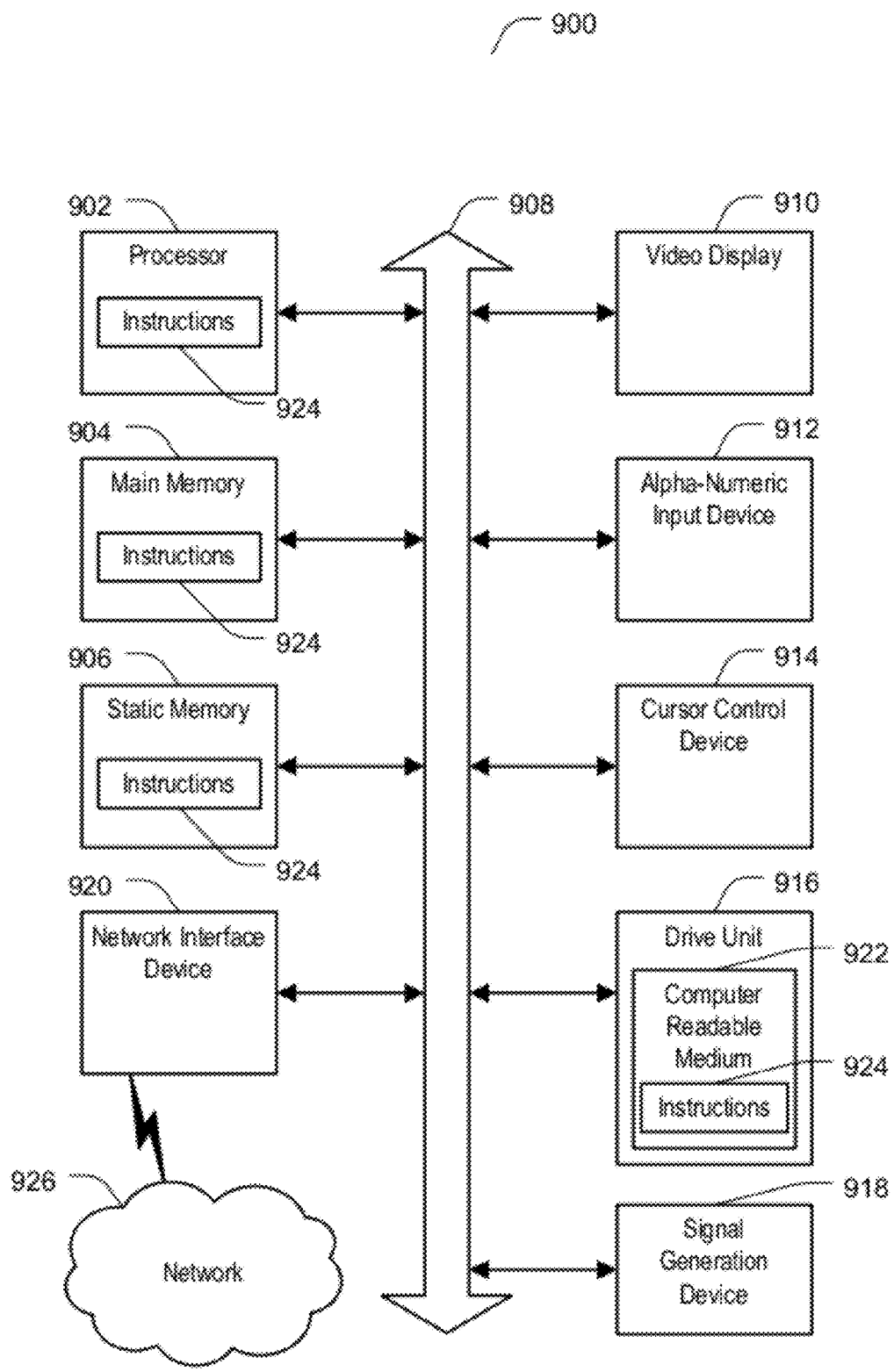
FIG. 9 is a block diagram of an illustrative embodiment of a general computer system.

As illustrated in FIG. 9, the computer system 900 may include a processor 902, e.g., a central processing unit (CPU), a graphics-processing unit (GPU), or both. Moreover, the computer system 900 can include a main memory 904 and a static memory 906 that can communicate with each other via a bus 908. As shown, the computer system 900 may further include or be coupled to a video display unit 910, such as a liquid crystal display (LCD), an organic light emitting diode (OLED), a flat panel display, a solid-state display, or a projection display. For example, the video display unit 910 may include the display device 140 of FIG. 1. Additionally, the computer system 900 may include an input device 912, such as a keyboard, a remote control device, and a cursor control device 914, such as a mouse. The computer system 900 can also include a disk drive unit 916, a signal generation device 918, such as a speaker or remote control device, and a network interface device 920. The network interface device 920 may be coupled to other devices (not shown) via a network 926.

In a particular embodiment, as depicted in FIG. 9, the disk drive unit 916 may include a computer-readable medium 922 in which one or more sets of instructions 924, e.g. software, can be embedded. Further, the instructions 924 may embody one or more of the methods or logic as described herein. In a particular embodiment, the instructions 924 may reside completely, or at least partially, within the main memory 904, the static memory 906, and/or within the processor 902 during execution by the computer system 900. The main memory 904 and the processor 902 also may include computer-readable media.

Dedicated hardware implementations, such as application specific integrated circuits, programmable logic arrays and other hardware devices, can be constructed to implement one or more of the methods described herein. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limiting embodiment, implementations can include distributed processing, component/object distributed processing, and parallel processing. Alternatively, virtual computer system processing can be constructed to implement one or more of the methods or functionality as described herein.

The present disclosure contemplates a processor-readable medium 104 that includes instructions 106 so that a set top box device connected to one or more networks can receive and process voice, video or data from the network(s). Further, the instructions 106 may be transmitted or received over the network 135 via the network interface 136.

While the processor-readable medium is shown to be a single medium, the term "processor-readable medium" includes a single medium or multiple media, such as a centralized or distributed database, and/or associated caches and servers that store one or more sets of instructions. The term "processor-readable medium" shall also include any tangible medium that is capable of storing a set of instructions for execution by a processor or that cause a computer system to perform any one or more of the methods or operations disclosed herein.

In a particular non-limiting, exemplary embodiment, the processor-readable medium can include a solid-state memory such as a memory card or other package that houses one or more non-volatile read-only memories. Further, the processor-readable medium can be a random access memory or other volatile re-writable memory. Additionally, the processor-readable medium can include a magneto-optical or optical medium, such as a disk or tapes or other storage device. Accordingly, the disclosure is considered to include a processor-readable medium in which data or instructions may be stored.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The above disclosed subject matter is to be considered illustrative, and not restrictive, and the appended claims are intended to cover all such modifications, enhancements, and other embodiments which fall within the scope of the claims. Thus, the claims shall not be restricted or limited by the foregoing detailed description.

What is claimed is:

1. A set top box device comprising:
an interface to receive data including at least one of Internet data and video data;
a processor; and
a memory accessible to the processor, the memory including instructions executable by the processor to cause the processor to perform a method comprising:
detecting a problem with the data, wherein content of the data that is received is displayed in a first display window of a display device, and
in response to detecting the problem with the data, automatically changing a size of the first display window displaying the content of the data in which the problem with the data is detected.

2. The set top box device of claim 1, wherein detecting the problem includes detecting a loss of synchronization of a signal.

3. The set top box device of claim 1, wherein detecting the problem includes detecting a loss of signal quality.

4. The set top box device of claim 1, wherein detecting the problem includes detecting a type of malware.

5. The set top box device of claim 1, wherein the processor simultaneously and separately renders Internet content, video content, and voice content.

6. The set top box device of claim 1, wherein the method further comprises adjusting parameters of a decoder in response to detecting the problem with the data.

7. The set top box device of claim 1, wherein the method further comprises automatically initiating a default action in response to detecting the problem with the data.

8. The set top box device of claim 7, wherein the default action includes rebooting the set top box.

9. A non-transitory processor-readable medium comprising processor-readable instructions, that when executed by a processor, cause the processor to perform a method comprising:
processing data received from a network to detect a problem with the data, wherein the content of the data is displayed in a display window of a display device; and
in response to detecting the problem with the data, automatically changing a size of the display window displaying the content of the data in which the problem is detected.

10. The non-transitory processor-readable medium of claim 9, wherein the method further comprises automatically taking an action pre-selected by a user in response to detecting the problem with the data.

11. The non-transitory processor readable medium of claim 10, wherein the action to be automatically taken includes adjusting parameters of a channel estimator.

12. The non-transitory processor-readable medium of claim 10, wherein the action to be automatically taken includes displaying a message concerning the problem that is detected with the data.

13. The non-transitory processor-readable medium of claim 12, wherein the message includes a list of options to respond to the problem that is detected with the data.

14. The non-transitory processor-readable medium of claim 13, wherein the list of options includes an option to reboot a set top box device.

15. The non-transitory processor-readable medium of claim 10, wherein the action to be automatically taken includes sending a signal to a source of the data in which the problem is detected with the data.

16. A method comprising:
monitoring, at a set top box device, data to detect a first problem related to the data, wherein a type of the data is one of Internet data and video data; and
automatically reducing a size of a display window associated with the data in response to detecting the first problem related to the data.

17. The method of claim 16, further comprising automatically taking a remedial action in response to detecting the first problem related to the data.

18. The method of claim 17, wherein the remedial action includes re-synchronizing a signal.

19. The method of claim 16, further comprising:
monitoring, at the set top box device, voice data to detect a second problem related to the voice data; and
automatically taking an action upon detecting the second problem.

20. The method of claim 19, wherein the action includes performing a self-test of the set top box device.

* * * * *